United States Patent Office 3,331,830
Patented July 18, 1967

3,331,830
1-SUBSTITUTED-4-SUBSTITUTED AMINO-ALKYLENE PIPERAZINES
Andrew Stephen Tomcufcik, Old Tappan, N.J., Paul Frank Fabio, Pearl River, N.Y., and Arlene May Hoffman, Park Ridge, N.J., assignors to American Cyanamid Company, Stamford, Conn., a corporation of Maine
No Drawing. Filed June 29, 1965, Ser. No. 468,143
17 Claims. (Cl. 260—154)

This application is a continuation-in-part of application Ser. No. 270,534 filed Apr. 4, 1963, now abandoned.

This invention relates to 1-substituted-4-substituted aminopropylene piperazines and methods of preparing the same.

The novel piperazines of the present invention may be illustrated as follows:

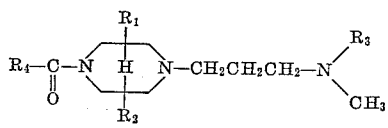

wherein $R_1$ and $R_2$ are selected from the group consisting of hydrogen and lower alkyl; $R_3$ is selected from the group consisting of alkyl of 1–12 carbon atoms and phenyl lower alkyl and $R_4$ is selected from the group consisting of lower alkoxyphenyl, halophenyl, trifluoromethylphenyl, phenylazophenyl, biphenyl, benzyloxy, trihalomethyl, halophenoxymethyl, phenylcyclopropyl, styryl, anthraquinonyl, furyl, nitrofuryl, thienyl, nitrothienyl, phenyltriazolyl, nitrophenyltriazolyl, benzofuroxanyl, and quinolyl, and therapeutically acceptable acid addition salts such as hydrochlorides, sulfates, maleates, and 1,1'-methylene-bis(2-naphthol-3-carboxylate), and quaternary ammonium salts.

The free bases of the above compounds are, in general, oils or lower melting solids, somewhat soluble in water and easily soluble in lower alkanols, benzene, toluene, acetone, chloroform or the like. The salts of the above compounds are characteristically soluble in water and other hydroxylated solvents and are usually insoluble in non-polar solvents.

The new compounds of this invention may be, for example, 1-(m-methoxybenzoyl)-4-(3-dimethylaminopropyl)-piperazine;
1-(o-chlorobenzoyl)-4-(3-dimethylaminopropyl)-piperazine;
1-(p-aminobenzoyl)-4-(3-dimethylaminopropyl)-piperazine;
1-(p-methylaminobenzoyl)-4-(3-dimethylaminopropyl)-piperazine;
isobutyl-4-(3-dimethylaminopropyl)-1-piperazine carboxylate;
1-(3-dimethylaminopropyl)-4-(3,4,5-trimethoxybenzoyl)-piperazine;

and benzyl-4-(3-dimethylaminopropyl)-1-piperazine carboxylate.

The new compounds of the present invention may be prepared by several general methods, the most important of which are as follows:

(1) A number of the compounds can be prepared by reacting an acyl halide with a 1-substituted methyl aminopropylene piperazine as follows:

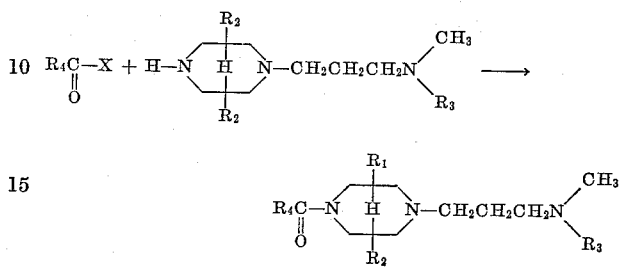

In the above reaction $R_1$, $R_2$, $R_3$ and $R_4$ are as hereinbefore defined and X is halogen. The above reaction may be carried out in a solvent such as, for example, water, diethyl ether, benzene, chloroform, tetrahydrofuran or the like. The reaction may be carried out by heating the reaction mixture alone or in the presence of an acid acceptor such as sodium bicarbonate, triethylamine, pyridine or the like.

(2) The present compounds are also prepared by reacting an N-acylpiperazine with an ω-substituted methyl aminopropylene halide. This reaction may be illustrated as follows:

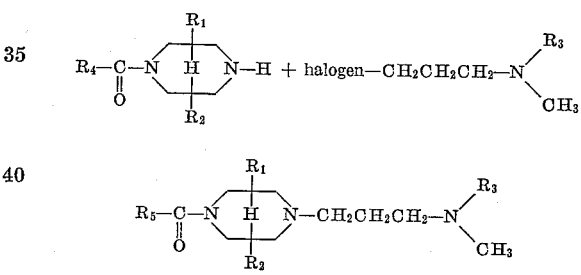

wherein $R_1$, $R_2$, $R_3$ and $R_4$ are as defined hereinbefore. The above reaction is usually carried out in a solvent such as a lower alkanol or the like by heating the reaction mixture in the presence of an acid acceptor such as a lower alkoxide or a carbonate or bicarbonate.

The compounds of the present invention are active in inhibiting the growth of protozoa of the genus Trypanosoma, different species of which are known to be the causative agent of serious parasitic diseases in man and animals (e.g., Trypanosomiasis or "sleeping sickness"). The compounds of this invention have been found to be active against experimental infections with *Trypanosoma cruzi* in mice. *Trypanosoma cruzi* is the causative agent of Chagas' disease in South America, an American trypanosomiasis.

In testing the compounds of the present invention 7- or 8-week-old female mice, weighing about 17 to 26 grams, were inoculated subcutaneously with *T. cruzi.*

The unit inocula contained approximately 50,000 parasites according to counts of pooled diluted donor blood made in hemacytometer chambers. Deaths among untreated and treated animals were recorded daily, with postinoculation observation periods ranging from one month to more than a year. The rapid graphic method of Litchfield (J. Pharmacol. and Exp. Therap. 97 339–408) was employed for the solution of time-percent effect curves involving groups of 7 to 20 variates. The application of this approximate statistical method to interpretations of morality data in experimental infections with *T. cruzi* has been discussed by Hewitt et al. (J. Parasitol 49:22–30).

Drug-diet treatment was employed for screening candidate compounds and for preliminary evaluation studies, primarily because of the simplicity of this method for administering compounds to large groups of animals for one week or longer. Appropriate amounts of the compounds, either in terms of the entire structure of the base content, were added to ground feed and were tumbled in a mechanical mixing machine for 1½ hours. The diet mixtures were placed in metal hoppers and were covered with metal stall-like partitions, allowing ad libitum feeding for groups of 7 to 10 mice per cage. An automatic timing switch provided alternate periods (12 hours) of light and darkness in the room where the mice were caged. Mean mouse weights were determined at three or more intervals during the period of medication. Approximate daily intakes per mouse, based on group consumption of feed throughout the treatment period, were calculated ultimately in terms of base content for each candidate compound.

Parenteral treatment, oral treatment by gavage, involving aqueous solutions of the compound (unit volumes, 0.2 or 0.4 ml.) were utilized in some tests as indicated. In some cases where treatment by gavage was employed, the mice were isolated in individual cages. Such caging procedures facilitated record keeping on individual mice, and possibly helped reduce the transmission of natural infections of unknown etiology.

The principal criterion employed for measuring chemotherapeutic activity in initial screening and evaluation tests was the prolongation of survival times in relation to appropriate untreated control infections. Weight changes and parasite counts (peripheral blood) were employed as supplementary criteria of activity in later evaluations. Parasite counts were made either from Giesma-stained thick blood films or from wet-film preparations. For the former method, uniform samples (5 microliters) of blood were withdrawn from the tails of mice in microcapillary pipettes and were spread over an etched grid (approximately 10 mm. square) placed under the specimen slide. Beginning in the center of the stained film and proceeding horizontally and vertically in relatively uniform patterns for all samples, from 10 to 100 fields (depending upon parasite density) were examined under an oil immersion objective (100×) and 10× oculars. Wet-film counts were made similarly from 2-microliter samples of blood placed under 22-mm. square cover slips (magnification: 270×). All parasite counts were expressed ultimately in terms of 100 microscopic fields. These types of peripheral blood examinations have relative, qualitative value in estimating degrees of parasitemia, but they offered time-saving advantages when large numbers of animals were involved. Generally, the frequency distributions of parasite counts among untreated animals or animals treated similarly were highly skewed, and medians were considered more representative than means for the calculation of midpoint values. The absence of parasites in 100 microscopic fields was not interpreted as unequivocal evidence of their complete disappearance from the peripheral blood.

The following table summarizes the testing results obtained with representative compounds.

TABLE

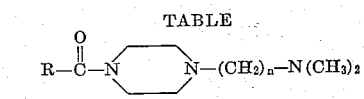

| R | n | Dosage of Free Base (mg./kg./day) | Median Survival Time (days) |
|---|---|---|---|
| 3,4,5-trimethoxyphenyl | 3 | 104 | 17 |
| 2-phenyl-2H-1,2,3-triazol-4-yl | 3 | 3 | >30 |
| Do | 2 | 11 | 12.5 |
| Tricholoromethyl | 3 | 58 | 19 |
| 5-nitro-2-furyl | 3 | 17 | 24 |
| 5-nitro-2-thenyl | 3 | 20 | 24 |
| 4-biphenylyl | 3 | 16 | >75 |
| 9,10-anthraquinon-2-yl | 3 | 14 | 21 |
| 6-quinolyl | 3 | 11 | 22 |
| 2,4-dichlorophenoxymethyl | 3 | 18 | 22 |
| 4-phenylazophenyl | 3 | 17 | >75 |
| 4-iodophenyl | 3 | 16 | >61 |
| 2-phenylvinyl | 3 | 16 | 22 |
| 3-trifluoromethylphenyl | 3 | 15 | 29 |
| Controls | | | 13–16 |

The compositions of the present invention are administered to warm-blooded animals in a dosage which may vary from 10 mg. to 1000 mg. The compositions may be in the form of tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium, phosphate, gums and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantgeous enteric coating comprises a styrene maleic acid copolymer to-acetate, and the like. A particularly advantageous enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosages for human and animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals. Examples of suitable oral unit dosage forms in accordance with this invention are tablets, capsules, pills, powder packets, granules, wafers, cachets, teaspoonfuls, dropperfuls, ampules, vials, segregated multiples of any of the foregoing and other forms as herein described.

The following examples describe in detail the preparation of representative 1-substituted-4-substituted aminopropylene piperazines of the present invention.

*Example 1.—Preparation of 1-benzoyl-4-(3-dimethylaminopropyl)piperazine dihydrochloride*

To a stirred mixture of 20.7 g. (50 mmol.) of 1-(3-dimethylaminopropyl)piperazine·3HBr and 150 ml. of 1 N sodium hydroxide is added dropwise and at 0–5° C., 11.6 ml. (0.1 mole) of benzoyl chloride and 270 ml. of 1 N sodium hydroxide (20% excess) simultaneously during 30 minutes. Stirring with ice bath cooling is continued for one hour after which time 110 g. of solid sodium chloride is added, followed by extraction with three 250 ml. portions of chloroform. The residual oil (15.3 g.), obtained by stripping the extract of solvent at the water pump, is dissolved in 150 ml. of ethanol. The resulting solution is cooled and treated with an excess of ethanolic hydrogen chloride (ice bath cooling) to give a white solid which is recrystallized from methanol to give analytically pure product, 11.6 g. (66.6%) melting point 274–278° C. (dec.).

*Example 2.—Preparation of 1-(3-dimethylaminopropyl)-(3,4,5-trimethoxybenzoyl)piperazine dihydrochloride*

The subject compound is prepared essentially by the procedure of Example 1, an equimolar quantity of 3,4,5-trimethoxybenzoyl chloride replacing the benzoyl chloride. In this case pyridine is employed as the acid binder and as solvent. The compound is a white solid, melting point 263°–265° C., with decomposition.

*Example 3.—Preparation of benzyl 4-(3-dimethylaminopropyl)-1-piperazine carboxylate dihydrochloride*

A mixture of 55 g. of benzyl 1-piperazinecarboxylate, 79 g. of 3-dimethylaminopropyl chloride hydrochloride, 60 g. of sodium bicarbonate and 500 ml. of methyl Cellosolve is stirred at reflux for 3 hours. The methyl Cellosolve is then removed by distillation water under reduced pressure. The residue is dissolved in 250 ml. of water and the water solution is then saturated with solid potassium carbonate. Extraction with 700 ml. of chloroform, followed by removal of the chloroform by distillation gives a thick residual oil. This is dissolved in 250 ml. of isopropanol and a solution of 26 g. of hydrogen chloride in 100 ml. of isopropanol is added. The resultant precipitate is collected, washed with ether, dried and recrystallized from ethanol. The pure compound is obtained as a white crystalline solid, melting point 218–219° C. with decomposition.

*Example 4.—Preparation of 1-(2,4-dichlorobenzoyl)-4-(3-dimethylaminopropyl)piperazine dihydrochloride*

A solution of 7.5 g. (0.036 mole) of 2,4-dichlorobenzoyl chloride in 100 ml. of diethyl ether is added to a stirred solution of 5.4 g. (0.032 mole) of 1-(3-dimethylaminopropyl)piperazine in 400 ml. of diethyl ether. An immediate precipitate forms. The mixture is stirred at room temperature for an hour and then allowed to stand overnight. A solution of 2.6 g. of dry hydrogen chloride in 10 ml. of isopropanol is then added. The white crystalline solid is collected and recrystallized from methanol to give 9.5 g. of pure compound, decomposing at 265°–270° C.

*Example 5.—Preparation of 1-(3-dimethylaminopropyl)-4-(2-furoyl)piperazine dihydrochloride*

The subject compound is prepared essentially by the method of Example 4, an equimolar quantity of 2-furoyl chloride replacing the 2,4-dichlorobenzoyl chloride. The compound is a white solid melting at 268° C. with decomposition.

*Example 6.—Preparation of 1-(3-dimethylaminopropyl)-4-(2-phenyl-2H-1,2,3-triazol-4-oyl)piperazine dimaleate*

The subject compound is prepared essentially by the procedure of Example 4, an equimolar quantity of 2-phenyl-2H-1,2,3-triazol-4-oyl chloride replacing the 2,4-dichlorobenzoyl chloride. The compound is purified as the dimaleate salt melting at 176°–177° C.

*Example 7.—Preparation of n-octyl-4-(3-dimethylaminopropyl)piperazine-1-carboxylate dihydrochloride*

The compound is prepared essentially by the method of Example 4, an equimolar quantity of n-octyl chloroformate replacing the 2,4-dichlorobenzoyl chloride. The compound is a white crystalline solid, melting at 258°–259° C. with decomposition.

*Example 8.—Preparation of 1-(3-dimethylaminopropyl)-4-trichloroacetylpiperazine dihydrochloride*

The subject compound is prepared essentially by the method of Example 4, an equimolar quantity of trichloroacetyl chloride replacing the 2,4-dichlorobenzoyl chloride. The compound is a white solid, decomposing at 240–245° C.

*Example 9.—Preparation of 1-benzoyl-trans-2,5-dimethyl-4-(3-dimethylaminopropyl)piperazine dimaleate*

This compound is prepared by the method of Example 1, an equimolar quantity of trans 2,5-dimethyl-1-(3-dimethylaminopropyl)piperazine replacing the 1-(3-dimethylaminopropyl)piperazine. The product is recovered as described in Example 1.

*Example 10.—Preparation of 1-benzoyl-4-(3-benzylmethylaminopropyl)piperazine dihydrochloride*

This compound is prepared by the method of Example 1, an equimolar quantity of 1-(3-benzylmethylaminopropyl)piperazine replacing the 1-(3-dimethylaminopropyl)piperazine. The compound is recovered as described in Example 1.

*Example 11.—Preparation of 1-(3-dimethylaminopropyl)-4 - (2,4 - dichlorophenoxyacetyl)piperazinedihydrochloride*

The compound is prepared by the method described in Example 4, an equimolar quantity of 2,4-dichlorophenoxyacetyl chloride replacing the 2,4-dichlorobenzoyl chloride. The compound melts at 242°–243° C. with decomposition.

*Example 12.—Preparation of 1-(3-dimethylaminopropyl)-4-(benzofuroxan-5-carbonyl)piperazine dimaleate*

This compound is prepared by the procedure of Example 4, an equimolar quantity of benzofuroxan-5-carbonyl chloride replacing the 2,4-dichlorobenzoyl chloride. The compound is purified as the dimaleate salt, melting at 198°–200° C. with decomposition.

*Example 13.—Preparation of 1-(3-dimetyhlaminopropyl)-4-(4-iodobenzoyl)piperazine dimaleate*

The compound is prepared by the method of Example 4, an equimolar quanity of 4-iodobenzoyl chloride replacing the 2,4-dichlorobenzoyl chloride. The compound is purified as the dimaleate salt, melting at 170°–171° C. with decomposition.

*Example 14.—Preparation of 1-(3-dimethylaminopropyl)-4-(4-phenylazobenzoyl)piperazine dimaleate*

The above compound is prepared by the method of Example 4, an equimolar quantity of 4-phenylazobenzoyl chloride replacing the 2,4-dichlorobenzoyl chloride. The compound is purified as the dimaleate salt melting at 188°–190° C.

*Example 15.—Preparation of 1-(3-dimethylaminopropyl)-4-(4-biphenyloyl)piperazine dimaleate*

The compound is prepared by the procedure of Example 4, an equimolar quantity of 4-biphenyloyl chloride replacing the 2,4-dichlorobenzoyl chloride. The compound is purified as the dimaleate salt melting at 194°–196° C.

*Example 16.—Preparation of 1-(3-dimethylaminopropyl)-4-(quinoline-6-carbonyl)piperazine dimaleate*

The compound is prepared by the procedure of Example 4, an equimolar quantity of quinoline-6-carbonyl chloride replacing the 2,4-dichlorobenzoyl chloride. The compound is purified as the dimaleate salt melting at 167°–169° C. with decomposition.

*Example 17.—Preparation of 1-(3-dimethylaminopropyl)-4 - (2 - phenylcyclopropylcarbonyl)piperazine dihydrochloride*

Using the method of Example 4, and substituting an equimolar quantity of 2-phenylcyclopropylcarbonyl chloride for the 2,4-dichlorobenzoyl chloride, the above compound is obtained which melts at 255°–256° C. with decomposition.

*Example 18.—Preparation of 1-(3-dimethylaminopropyl)-4 - (2H - 2 - (2,4 - dinitrophenyl) -1,2,3 - triazole - 4-carbonyl)piperazine*

The above compound is prepared by the method of Example 4, an equimolar quantity of 2H-2-(2,4-dinitrophenyl)-1,2,3-triazole-4-carbonyl chloride replacing the 2,4-dichlorobenzoyl chloride. The compound melts at 89°–92° C.

*Example 19.—Preparation of 1-(3-dimethylaminopropyl)-4-(cinnamoyl)piperazine dimaleate*

The compound is prepared by the method of Example 4, an equimolar quantity of cinnamoyl chloride replacing the 2,4-dichlorobenzoyl chloride. The compound is purified as the dimaleate salt melting at 179°–180° C. with decomposition.

*Example 20.—Preparation of 1-(3-dimethylaminopropyl)-4 - (3 - trifluoromethylbenzoyl)piperazine dihydrochloride*

The compound is prepared by the procedure of Example 4, an equimolar quantity of 3-trifluoromethylbenzoyl chloride replacing the 2,4-dichlorobenzoyl chloride. The compound melts at 283° C. with decomposition.

*Example 21.—Preparation of 1-(3-dimethylaminopropyl)-4-(5-nitro-2-thenoyl)piperazine dihydrochloride*

The above compound is prepared by the procedure described in Example 4, an equimolar quantity of 5-nitro-2-thenoyl chloride replacing the 2,4-dichlorobenzoyl chloride. The compound melts at 282°–283° C. with decomposition.

*Example 22.—Preparation of 1-(3-dimethylaminopropyl)-4-(2,3,6-trichlorobenzoyl)piperazine dihydrochloride*

The compound is prepared by the procedure of Example 4, an equimolar quantity of 2,3,6-trichlorobenzoyl chloride replacing the 2,4-dichlorobenzoyl chloride. The compound melts at 270° C. with decomposition.

*Example 23.—Preparation of 1-(3-dimethylaminopropyl)-4-(5-nitro-2-furoyl)-piperazine dihydrochloride*

The above compound is prepared by a method essentially as described in Example 4, an equimolar quantity of 5-nitro-2-furoyl chloride replacing the 2,4-dichlorobenzoyl chloride. The compound melts at 250°–255° C. with decomposition.

*Example 24.—Preparation of 1-(3-dimethylaminopropyl)-4(9,10 - anthraquinone-2-carbonyl)piperazine dihydrochloride*

The above compound is prepared essentially by the method of Example 4, an equimolar quantity of 9,10-anthraquinone-2-carbonyl chloride replacing the 2,4-dichlorobenzoyl chloride. The compound melts at 296° C. with decomposition.

*Example 25.—Preparation of 1-[3-(N-methyl-n-butylamino)propyl]-4 - (2-phenyl - 2H - 1,2,3-triazol-4-oyl) piperazine dimaleate*

The above compound is prepared by the procedure of Example 6 except that an equimolar quantity of 1-[3-(N-methyl-n-butylamino)propyl]piperazine is used in place of 1-(3-dimethylaminopropyl)piperazine.

*Example 26.—Preparation of 1-[3-(N-methyl-n-dodecylamino)propyl]-4-(4-biphenoyl)piperazine dimaleate*

The compound is prepared by the procedure of Example 4, an equimolar quantity of 1-(3-N-methyl-n-dodecylamino)propylpiperazine replacing the 1-(3-dimethylaminopropyl)piperazine.

We claim:

1. A compound of the group consisting of those having the formula:

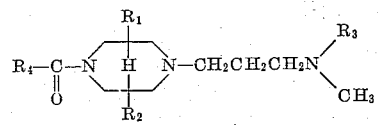

wherein $R_1$ and $R_2$ are selected from the group consisting of hydrogen and lower alkyl; $R_3$ is selected from the group consisting of alkyl of 1 to 12 carbon atoms and phenyl lower alkyl and $R_4$ is selected from the group consisting of lower alkoxyphenyl, halophenyl, trifluoromethylphenyl, phenylazophenyl, benzyloxy, trihalomethyl, halophenoxymethyl, phenylcyclopropyl, styryl, anthraquinonyl, furyl, nitrofuryl, thienyl, nitrothienyl, phenyltriazolyl, nitrophenyltriazolyl, benzofuroxanyl, biphenyl, n-octyloxy, and quinolyl, and therapeutically acceptable acid addition and quaternary ammonium salts.

2. The compound of the formula:

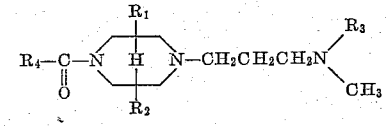

wherein $R_1$ and $R_2$ are hydrogen, $R_3$ is lower alkyl and $R_4$ is phenyltriazolyl.

3. The compound 1-(3-dimethylaminopropyl)-4-(2,4-dichlorophenoxyacetyl)piperazine.

4. The compound 1-(3-dimethylaminopropyl)-4-(3,4,5-trimethoxybenzoyl)piperazine.

5. The compound benzyl-4-(3-dimethylaminopropyl)-1-piperazine carboxylate.

6. The compound 1 - (2,4 - dichlorobenzoyl)-4-(3-dimethylaminopropyl)piperazine.

7. The compound 1 - (3 - dimethylaminopropyl)-4-(4-phenylazobenzoyl)piperazine.

8. The compound 1 - (3-dimethylaminopropyl)-4-(2-phenyl-2H-1,2,3-triazol-4-oyl)piperazine.

9. The compound n-octyl-4-(3-dimethylaminopropyl)piperazine-1-carboxylate.

10. The compound 1-(3-dimethylaminopropyl)-4-trichloroacetyl piperazine.

11. The compound 1-benzoyl-trans-2,5-dimethyl-4-(3-dimethylaminopropyl)piperazine.

12. The compound 1-(3-dimethylaminopropyl)-4-(4-biphenyloyl)piperazine.

13. The compound 1 - (3-dimethylaminopropyl)-4-(4-iodobenzoyl)piperazine.

14. The compound 1-(3-dimethylaminopropyl)-4-(cinnamoyl)piperazine.

15. The compound 1-(3-dimethylaminopropyl)-4-(3-trifluoromethylbenzoyl)piperazine.

16. The compound 1-(3-dimethylaminopropyl)-4-(5-nitro-2-thenoyl)piperazine.

17. The compound 1-(3-dimethylaminopropyl)-4-(5-nitro-2-furoyl)piperazine.

No references cited.

HENRY R. JILES, *Primary Examiner*.